United States Patent [19]

Hansen

[11] 4,312,408
[45] Jan. 26, 1982

[54] OVERLOAD TOOL MOUNTING ASSEMBLY FOR SOIL TILLING IMPLEMENT

[76] Inventor: Elmer K. Hansen, 801 S. Martha, Sioux City, Iowa 51102

[21] Appl. No.: 115,520

[22] Filed: Jan. 25, 1980

Related U.S. Application Data

[63] Continuation of Ser. No. 915,565, Jun. 14, 1978.

[51] Int. Cl.³ .................. A01B 13/08; A01B 61/04
[52] U.S. Cl. .................... 172/267; 172/699; 172/268
[58] Field of Search ............ 172/264, 265, 266, 267, 172/268, 269, 699

[56] References Cited

U.S. PATENT DOCUMENTS

| | | | |
|---|---|---|---|
| 631,232 | 8/1899 | Sobey | 172/266 |
| 894,787 | 7/1908 | Waterman | 172/266 |
| 903,117 | 11/1908 | Waterman | 172/268 |
| 1,004,224 | 9/1911 | Willis | 172/266 |
| 2,493,811 | 1/1950 | Graham | 172/657 |
| 3,529,673 | 9/1970 | Morris | 172/266 |
| 3,559,747 | 2/1971 | Cline | 172/699 |
| 3,700,039 | 10/1972 | Essex | 172/265 |
| 3,960,220 | 6/1976 | Laitala | 172/269 |
| 3,972,374 | 8/1976 | Venable | 172/266 |
| 4,116,281 | 9/1978 | Lant | 172/267 |

FOREIGN PATENT DOCUMENTS

| | | | |
|---|---|---|---|
| 731389 | 4/1966 | Canada | 172/267 |
| 840124 | 4/1970 | Canada | 172/264 |

Primary Examiner—Richard J. Johnson
Attorney, Agent, or Firm—Rudolph L. Lowell; G. Brian Pingel

[57] ABSTRACT

An assembly for mounting the shank of a ground tool to a clamping plate carried on the tool bar of a soil tilling farm implement. The mounting assembly has a mounting member for attachment to the clamping plate, a first pivotal connection of the tool shank with the mounting member, and a variable pressure unit associated with the tool shank and the mounting member for applying a variably decreasing pressure on the ground tool during movement thereof from an operating position to an inoperative position. The pressure applied by the variable pressure unit, in a first moved position therefor, acts to initially hold the ground tool in the operating position, and in a second moved position being rendered ineffective to return the ground tool to the operating position. The variable pressure unit is movable from the first position to the second position therefor by movement of the ground tool, in response to striking an obstruction in the soil, and provides for the initial application of a counter pressure on the tool greater than the initial tool holding pressure applied by the variable pressure unit.

1 Claim, 21 Drawing Figures

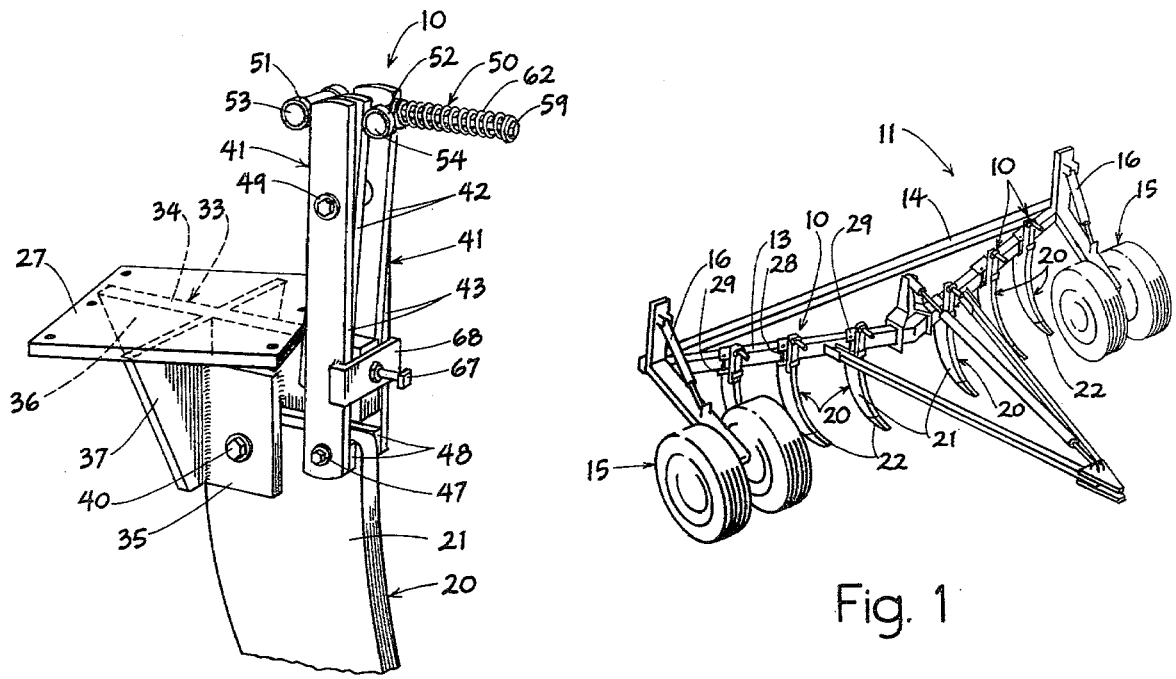

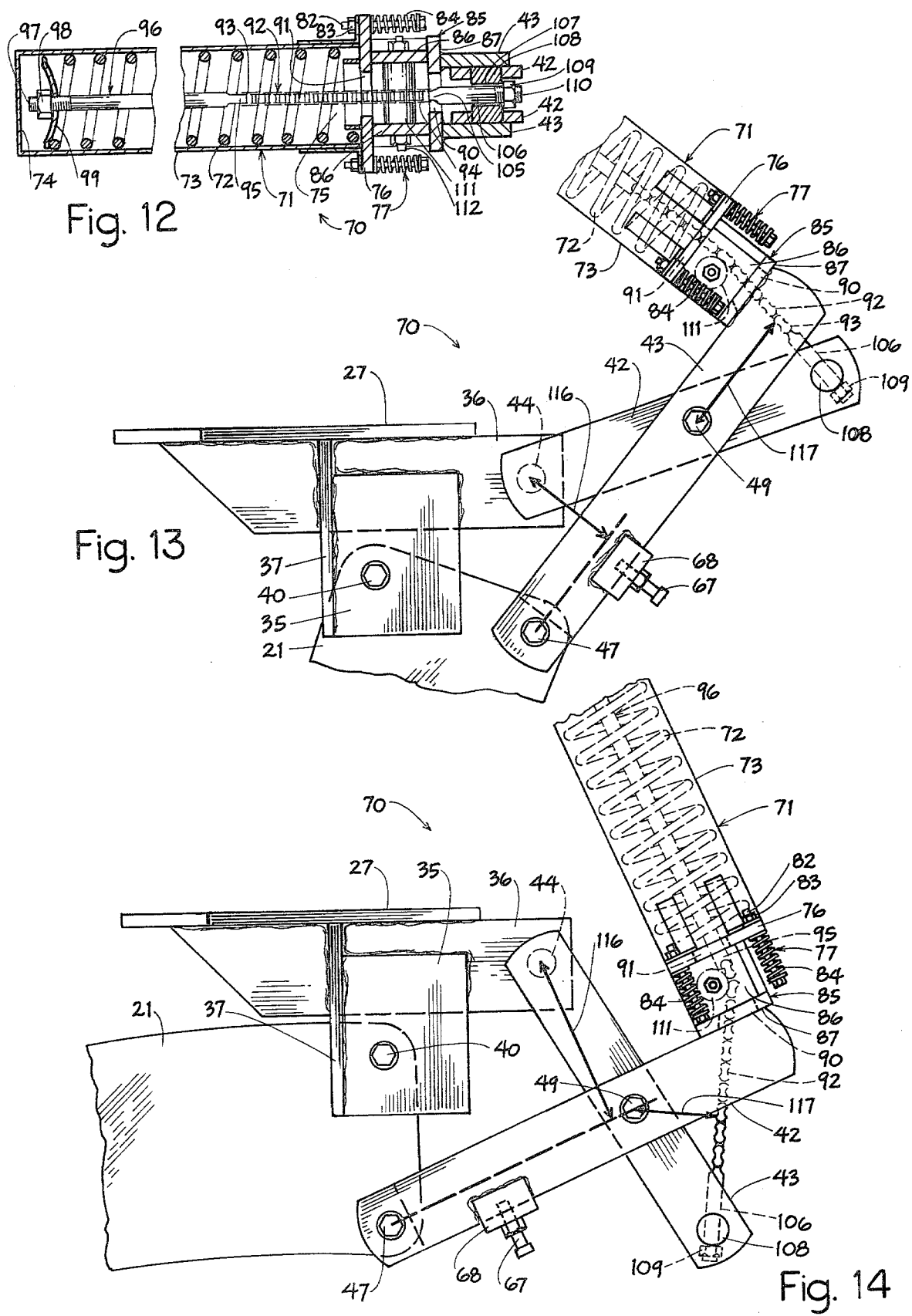

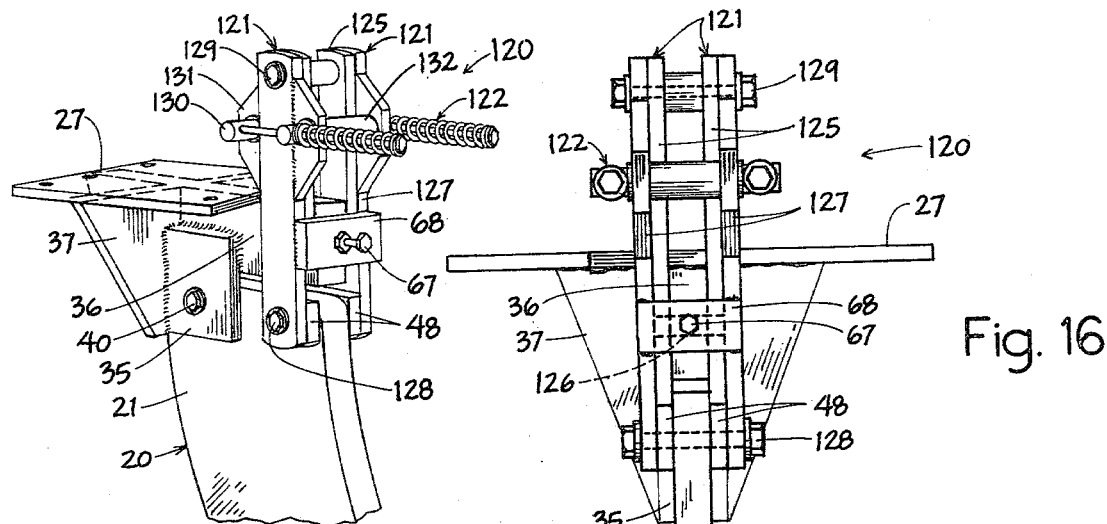
Fig. 15
Fig. 16
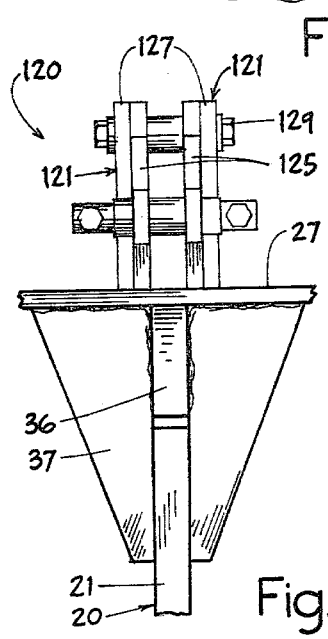
Fig. 17
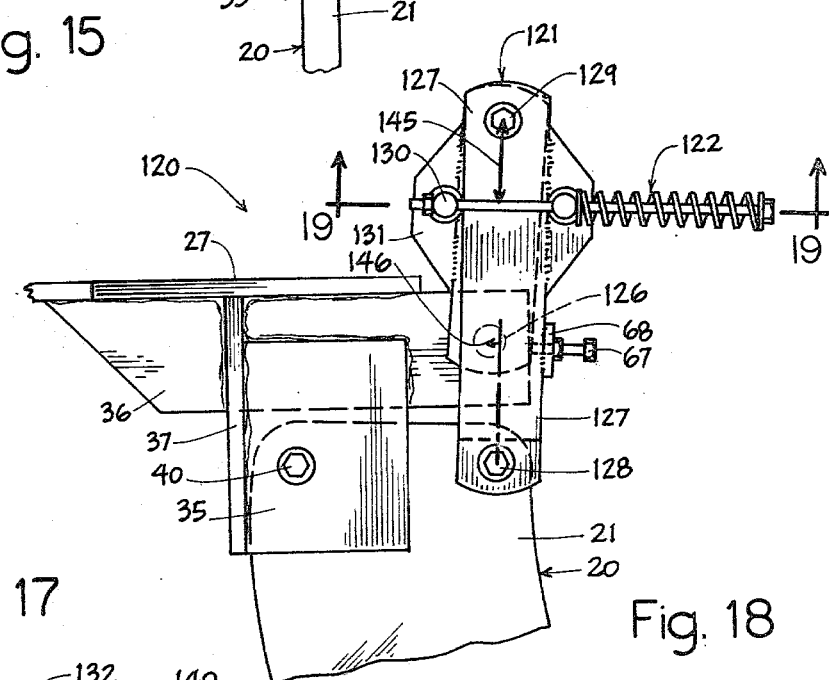
Fig. 18
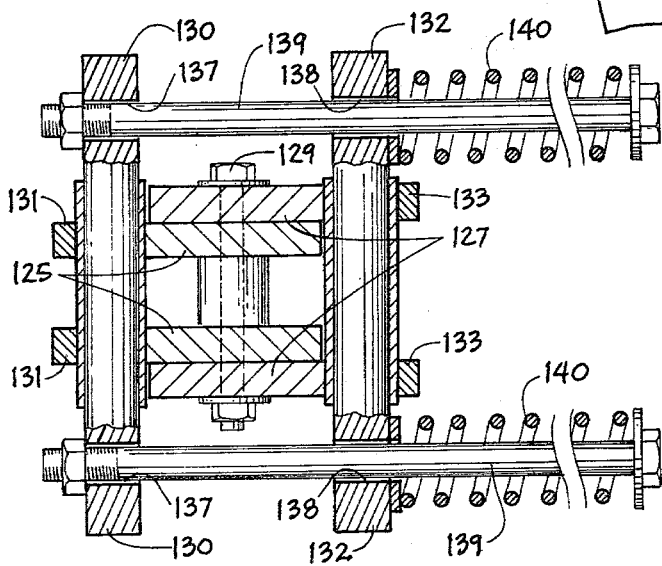
Fig. 19

18 4,312,408

OVERLOAD TOOL MOUNTING ASSEMBLY FOR SOIL TILLING IMPLEMENT

This is a continuation, of application Ser. No. 915,565, filed June 14, 1978.

BACKGROUND OF THE INVENTION

1. Field of the Invention

The present invention relates in general to assemblies for mounting or coupling the shank of a ground tool to the tool bar of a soil tilling farm implement, and more specifically relates to such assemblies that release the ground tool for pivotal movement out of an operating position upon encountering obstructions in the soil.

2. Description of the Prior Art

Assemblies for movably coupling ground tools to a tool bar of a soil tilling farm implement are well known in the art. A typical such assembly is disclosed in U.S. Pat. No. 2,493,811 wherein a tool has a shank pivotally interconnected to a support plate and to a spring unit that has a coil spring compressed when the tool is pivoted. The coil spring provides an initial pressure on the tool to hold it in a normal operating position during soil tilling operation. When the tool encounters an obstruction in the soil the force applied on the tool overcomes the initial spring pressure and pivots the tool from the normal operating position. When the obstruction has been passed, the compressed spring causes the tool to return to the normal operating position therefor.

The above type of assembly provides an improvement over a fixed mounting of a tool to a tool bar. However, in operation the pressure exerted by the coil spring during pivotal movement of the tool to the obstruction passing position therefor is progressively increased. U.S. Pat. No. 3,700,039 discloses an assembly intended to reduce this problem by decreasing the moment arm of the spring force, as the spring is compressed, so that the counter force required to pivot the tool is maintained only slightly greater than the initial tool holding force. However, neither of the above references provides an assembly that holds a tool in an operating position with a force that is substantially decreased as the tool is pivoted out of the operating position to minimize tool damage as the result of encountering an obstruction.

SUMMARY OF THE INVENTION

The present invention provides an assembly for pivotally mounting or coupling the shank of a ground tool to a tool bar of a soil tilling implement that permits the tool to pivot in an arc of substantially ninety degrees out of an operating position therefor when necessary to avoid or pass over an obstruction during a soil tilling operation. In operation, such coupling assembly applies an initial yieldable pressure on the tool to hold it in the operating position. Therefore, when the tool encounters an obstruction the force applied on the tool over comes the initial tool holding pressure to provide the pivotal movement of the tool out of its operating position. During this pivotal movement of the ground tool the initial holding pressure applied thereon is progressively decreased so as to substantially reduce the force required to continue pivotal movement of the tool to the obstruction passing position therefor.

After the tool is pivoted out of its normal operating position, the decreased yieldable pressure applied thereon by the coupling assembly is incapable of returning the tool through the soil to the operating position therefor. However, such return movement is readily accomplished by raising the tool bar to provide for a return movement of the ground tool to its operating position in a path unobstructed by soil. This return movement is provided by the decreased yieldable pressure complementing action of gravity on the tool.

BRIEF DESCRIPTION OF THE DRAWINGS

FIG. 1 is a perspective view of a soil tilling implement having a tool bar shown in assembly relation with a plurality of ground tool coupling assemblies embodying a first preferred embodiment of the present invention;

FIG. 2 is an enlarged perspective view of one of the coupling assemblies in FIG. 1 shown in assembly relation with a fragmentary upper portion of the shank of a tool, and wherein the tool is illustrated in a normal operating position, therefor;

FIG. 3 is an enlarged front view of the coupling assembly of FIG. 2;

FIG. 4 is an enlarged front view of the coupling assembly of FIG. 2;

FIG. 12 is a sectional view taken on line 12—12 of FIG. 11;

FIG. 13 is a side view illustrated similarly to FIG. 11, showing the coupling assembly in an intermediate position pivotally moved from the normal operating position therefor shown in FIG. 11;

FIG. 14 is a side view illustrated similarly to FIG. 13, showing the tool in the inoperative position therefor wherein the tool is at the maximum limit of its pivotal movement from the normal operating position therefor shown in FIG. 11;

FIG. 15 is a perspective view showing a third preferred embodiment of the coupling assembly of the present invention in assembly relation with a fragmentary upper portion of the shank of a tool wherein the tool is illustrated in a normal operating position therefor;

FIG. 16 is an enlarged front view of the coupling assembly of FIG. 15;

FIG. 17 is an enlarged rear view of the coupling assembly of FIG. 15;

FIG. 18 is an enlarged side view of the coupling assembly of FIG. 15;

FIG. 19 is a sectional view taken on line 19—19 of FIG. 18;

DESCRIPTION OF THE PREFERRED EMBODIMENT

Figure 7:
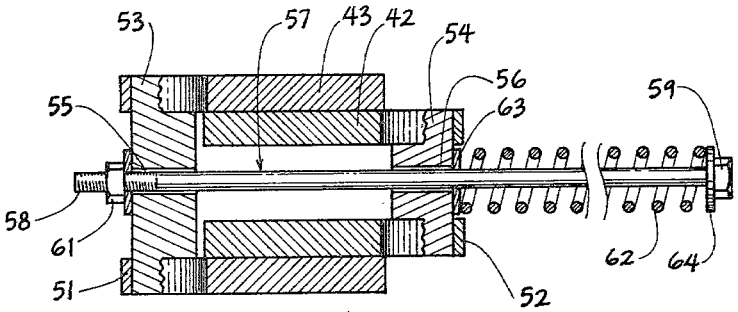
FIG. 7 is an enlarged sectional view taken on line 7—7 of FIG. 4.

A plurality of releasable tool coupling assemblies that represent a first preferred embodiment of the present invention, indicated generally at 10 in FIG. 1, are shown in assembly relation with an agricultural implement 11 which includes a main frame or tool bar 13 of a V-shape in plan view and formed of rectangular steel tubing with a crossbar 14 connected to and extended between the ends of the main frame 13 for reinforcement. The main frame 13 is supported off the ground in an elevated position by two pairs of dual guage wheels 15. The elevated position of the main frame 13 can be vertically varied by the use of two hydraulic cylinders 16 to raise or lower the frame 13 relative to the ground surface.

A plurality of ground working tools 20 are supported on and extended downwardly from the main frame 13. Each tool 20 includes a steel chisel plow shank 21 curved downwardly and forwardly from the main frame 13 to a tapered end adapted for receiving a replaceable chisel point 22. The shank 21 of the tools 20 are secured to the main frame 13 by means of the coupling assemblies 10 that each includes a clamping member 27 securable to the lower side of the main frame 13 by bolts 28 extended through an upper clamping member 29 on the upper side of the main frame 13. The coupling assemblies 10 are adapted to normally maintain the ground tools 20 in a downwardly extended position during soil tilling, but permit the tools 20 to pivot in a rearward direction out of engagement with the soil upon encountering large obstacles that could cause damage to the tools 20.

Referring to FIGS. 2 and 3, each of the assemblies 10 includes an upright main support member 33 having an upper surface 34 that is welded to the bottom surface of the clamping member 27. Rectangularly shaped connecting plates 35 are fixed to opposite sides 36 of the support member 33, as by welding, approximately medially thereof, and upright gussett plates 37, normal to the support member 33, are welded to the bottom surface of the clamping member 27, the opposite sides 36 of support member 33, and the rear ends of the connecting plates 35.

The connecting plates 35 extend downwardly from each side 36 of the support member 33 to define a channel therebetween in which the rear portion of the upper end of the tool shank 21 is pinned at 40 for pivotal movement relative to the support member 33. Thus, the plates 35 and pin connection 40 serve to provide a first pivotal connection between the tool 20 and the support member 33.

A second pivotal connection between the support member 33 and the ground tool 20 is provided by a pair of normally substantially upright link assemblies 41, each having inner and outer adjacent links 42 and 43, respectively. The front end of the support member 33 is disposed between the lower ends of the inner links 42 and is pinned thereto at 44, as indicated in FIGS. 3 and 4. The upper ends of the links 42 and 43 are coextensive, but the outer links 43 are longer than the inner links 42 and overlap the lower ends of the inner links 42 for pinning at 47 to the upper front portion of the tool shank 21. Spacers 48 are disposed between each of the outer links 43 and the tool shank 21 to limit movement of the tool 20 along the axis of the pin 47. The upper portions of the links 42 and 43 are pinned together at 49 to indirectly connect the tool shank 21 to the support member 33 via the link assemblies 41.

Figure 5:
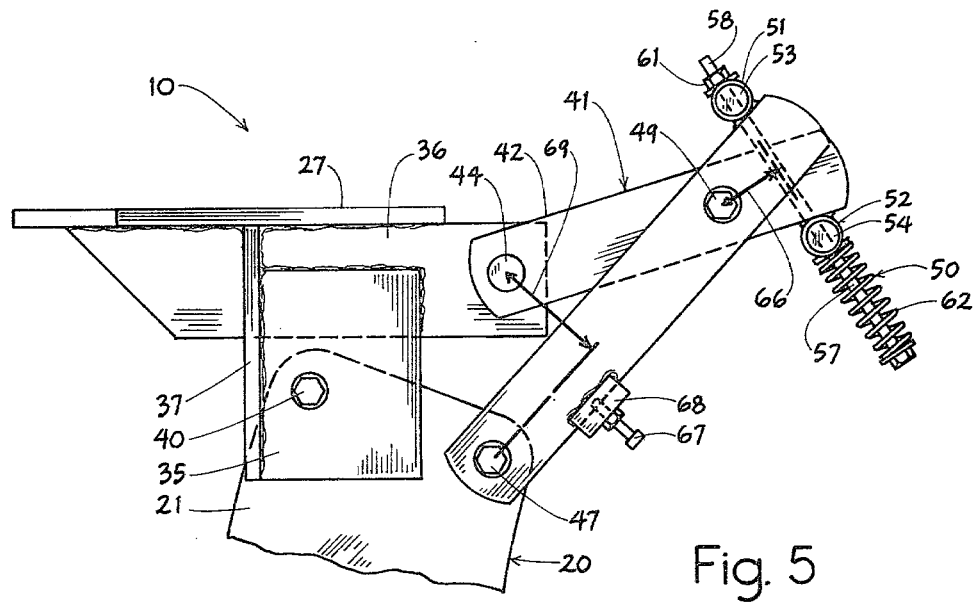
FIG. 5 is a side view illustrated similarly to FIG. 4, showing the coupling assembly in an intermediate position pivotally moved from the normal operating position, therefor shown in FIG. 4.
Figure 6:
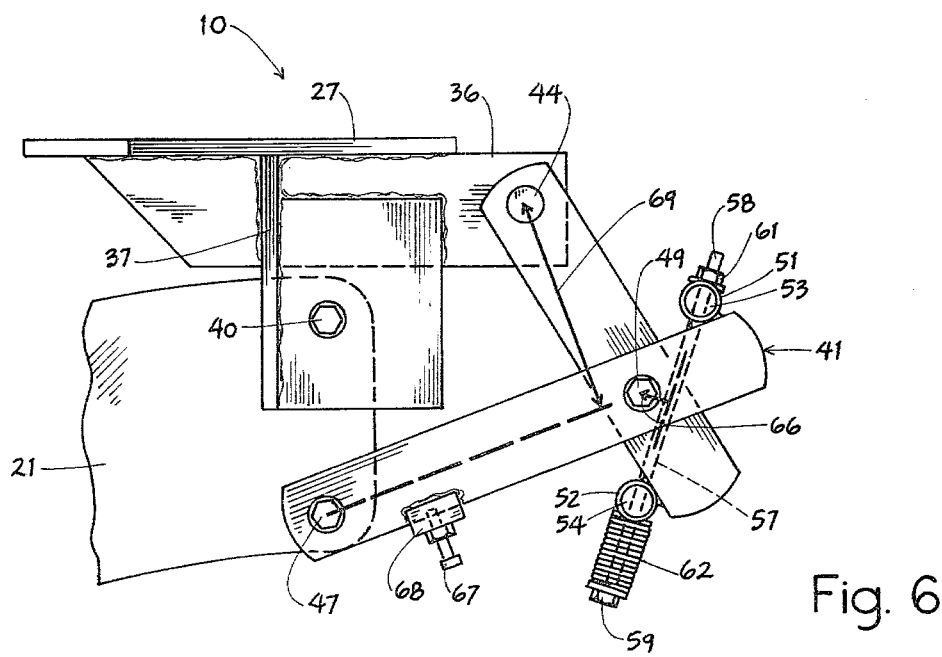
FIG. 6 is a side view illustrated similarly to FIG. 5, showing the tool in the inoperative position therefor wherein the tool is at the maximum limit of its pivotal movement from the normal operating position therefor shown in FIG. 4.

When the ground tool 20 encounters obstacles during soil tilling, it is rotatable clockwise about the pin connection 40, and the links 42 and 43, respectively, are pivotable clockwise, from their normal substantially upright position, about the pinned connections 44 and 47, as indicated by FIGS. 5 and 6, to permit the tool 20 to move rearwardly and upwardly out of contact with the obstacles. During such pivotal movement of the tool 20 the arrangement of the links 42 and 43 provides for translatory pivotal movement of the pin connections 47 and 49.

To hold the ground tool 20 from pivoting during normal soil tilling operation, a spring unit 50 is mounted on the upper ends of the link assemblies 41 above the pin connection 49. The spring unit 50 is attached to the assemblies 41 and includes journal members or brackets 51 secured to the rearwardly facing side edges of each of the outer links 43, and journal members or brackets 52 secured to the forwardly facing side edges of each of the inner links 42. Pins 53 and 54 are respectively held in place by the journal members 51 and 52, with the pin 53 serving as a tie bar between the links 43, and the pin 54 serving a similar function with respect to the links 42.

As shown in FIG. 7, the pins 53 and 54 have transversely formed bores 55 and 56, respectively, and are connected together by an elongated bolt 57 with a threaded end portion 58 extended through the bore 55 and a head portion 59 extended through the bore 56 to protrude outwardly from the pin 54. A nut 61 is threaded on the end portion 58 to prevent the bolt 57 from being pulled through the pin 53, and a coil spring 62 encircles the head portion 59 in a partially compressed condition between washers 63 and 64 that are carried on the bolt 57 to abut against the pin 54 and the head of the bolt 57, respectively. The spring 62 is under minimum compression when the axes of the inner and outer links 42 and 43, respectively, are approximately parallel to one another, as shown in FIG. 4, and as the link assemblies 41 pivot clockwise, as shown in FIGS. 5 and 6, the upper ends of the links 42 and 43 begin moving apart to increase the compression of the spring 62.

Thus, the spring unit 50 applies a yieldable pressure against the links 42 and 43 on a line of action that is coaxial with the axis of the bolt 57 and has a moment arm 66 (FIG. 4) with respect to the pin connection 49 to provide a torque on the links 42 and 43 urging their upper ends together. It is this torque that must be overcome as the tool 20 is pivoted from its normal soil engaging position.

It should be noted, as indicated in FIG. 4, that a bolt 67 is threaded through a plate 68 fastened on the side surfaces of the outer links 43 for abutting against the front end of the mounting member 33 and holding the links 42 and 43 in a slightly, pivotally moved position. As a result, the pin connections 44, 47 and 49 do not all lie on a common line so that a rearwardly directed force applied or the ground tool 20 is transmitted to the outer links 43 on a line of action slightly off center of the pin connection 44 to provide a short moment arm 69 relative to the connection 44. If the pin connections 44, 47 and 49 were all on a common line, there would be no moment arm 69 for the rearwardly acting force on the tool 20.

When the force exerted on the ground tool 20, in conjunction with the moment arm 69, provides a torque on the link assemblies 41 sufficient to overcome the opposing torque provided by the pressure applied by the spring unit 50, the tool 20 is pivoted clockwise out of a normal soil engagement position. As such pivoting occurs, the length of the moment arm 69 increases, whereas the length of the moment arm 66 decreases as indicated by FIGS. 5 and 6. Therefore, although compression of the spring 62 increases during pivoting, the length decrease of the moment arm 66 actually reduces the torque opposing pivoting movement so that the tool 20 can readily be pivoted out of the way of obstacles encountered to prevent tool damage. Thus, to produce initial movement of the tool 20 out of a soil engagement position, a relatively large force on the tool 20 is required, but once such tool movement is initiated, the force required to sustain the movement progressively decreases, until reaching a minimum level when the tool 20 is pivoted clockwise to its extreme limit of movement, as shown in FIG. 6.

When the ground tool 20 has been pivoted from its normal soil engaging position, the spring unit 50 and the decreased moment arm 66 do not provide sufficient torque to return the tool 20 into an operating position in the soil. Accordingly, the implement main frame 13 must be raised to lift the tool 20 out of soil engagement before the action of the spring unit 50, together with the force of gravity, cause the tool 20 to return to an operating position.

Figure 8:
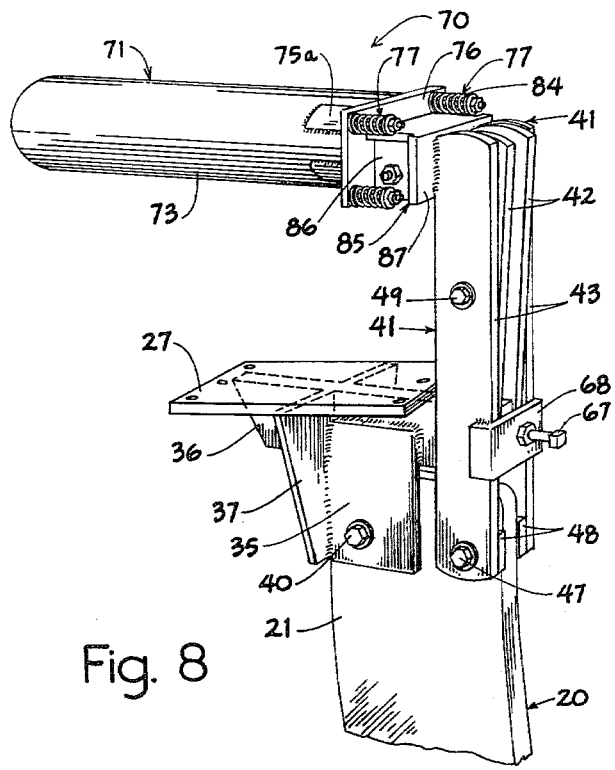
FIG. 8 is a perspective view of a second preferred embodiment of the coupling assembly of the present invention in assembly relation with a fragmentary upper portion of the shank of a tool wherein the tool is illustrated in a normal operating position therefor.
Figure 9:
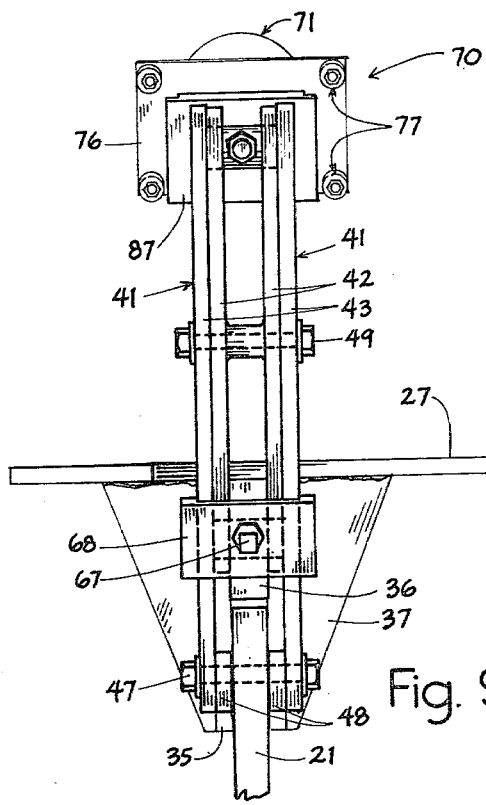
FIG. 9 is an enlarged front view of the coupling assembly of FIG. 8.

Referring now to FIGS. 8 and 9, a second preferred embodiment 70 of the tool coupling assembly of the present invention is shown. Because the assembly 70 is basically similar to the assembly 10, like components of the assemblies 10 and 70 have like numbers. The only difference between the assemblies 10 and 70 is that the assembly 70 has a rearwardly extended spring unit 71 associated with the link assemblies 41 in substitution for the spring unit 50 of the assembly 10.

Figure 10:
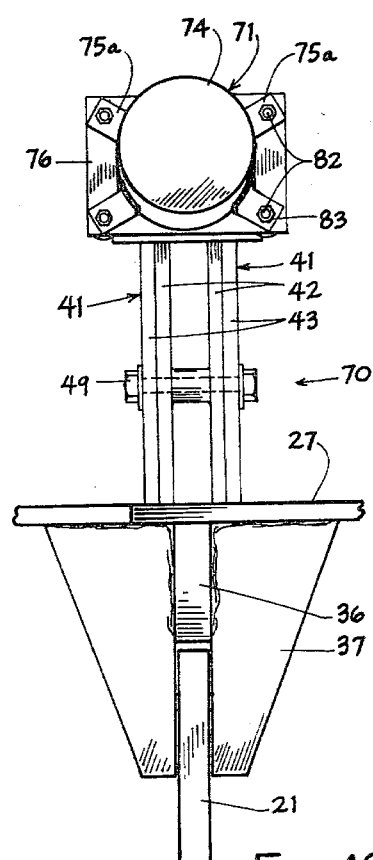
FIG. 10 is an enlarged rear view of the coupling assembly of FIG. 8.
Figure 11:
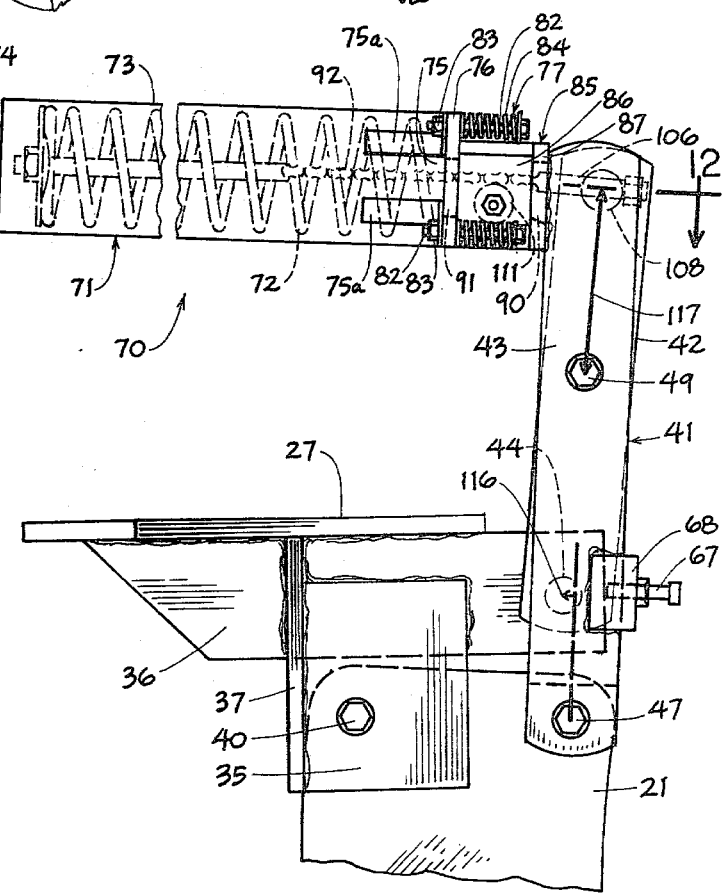
FIG. 11 is an enlarged side view of the coupling assembly of FIG. 8.

The spring unit 71 includes a stiff coil spring 72 (FIG. 11) that is disposed in a substantially cylindrical spring housing 73 normal to the link assemblies 41. The housing 73 includes a closed outer end 74 and an open inner end 75 on which four circumferentially spaced mounting ears 75a (FIG. 10) are fixed for bolting the housing 73 to a support plate 76 by preferably four spring-bolt assemblies 77 (FIG. 11). Included in each spring-bolt assembly 77 is a bolt 82 having a nut 83 threaded on one end, a partially compressed spring 84 that serves as a yieldable spacer between the head of the bolt 82 and the plate 76 for a purpose to be described below.

The support plate 76 serves to partially close off the rear side of a roller housing 85 (FIG. 12) that also includes two side walls 86 and a front wall 87 fixed to the upper portions of the rear side edges of the outer links 43. Apertures 90 and 91 are formed in the front wall 87 and the support plate 76, respectively, and a chain 92 with end links 93 and 94 is extended therethrough. The chain end link 93 is pinned to one end 95 of a first connecting rod 96 axially extended in the spring 72. The opposite end 97 of the rod 96 threadably mounts a nut 98, and an abutment plate 99 is disposed between the nut 98 and the spring 72. The chain end link 94 is pinned to one end 105 of a second connecting rod 106 that is extended between the inner links 42 to protrude through a bore 107 in a pin 108 that spans between and is journaled in the inner links 42. A nut 109 is threaded on an opposite end 110 of the connecting rod 106 to abut against the pin 108 so that the chain 92 and the connecting rods 96 and 106 serve to tie the upper portions of the links 42 and 43 together through the spring 72 and thereby provide a means for applying a yieldable pressure on the links 42 and 43 that opposes pivotal movement thereof.

Thus, the spring unit 71 applies a yieldable pressure on the link assemblies 41 similar to the pressure applied thereon by the spring unit 50. As shown by FIGS. 13 and 14, during clockwise pivotal movement of the link assemblies 41 in response to a rearwardly directed force on the tool 20, the chain 92 is pulled through the roller housing 85 to increase the compression of the spring 72. During such chain movement, the chain 92 rides on top of a guide roller 111 having an axle 112 rotatably mounted in the sidewalls 86 of the roller housing 85. The roller 111 is employed as a spacing means to hold the chain 92 from rubbing against the periphery of the aperture 90 in the housing front wall 87.

As further shown by FIGS. 13 and 14, the coupling assembly 70 has essentially the same operation as the assembly 10 in that a force applied on the ground tool 20 has an associated lever arm 116 that increases as the link assemblies 41 are pivoted clockwise, and the yieldable pressure of the spring unit 71 has an associated lever arm 117 that decreases during such movement. One advantage that the coupling assembly 70 provides by mounting of the spring unit 71 from the rear of the link assemblies 41 is that during the clockwise pivoting of the assemblies 41, the spring unit 71 will not be forced down into engagement with the soil being tilled and be bent or damaged thereby no matter what the length of the housing 73. However, rear mounting of the spring unit 71 presents a problem in that the spring unit 71 moves with considerable momentum and is abruptly stopped when the tool 20 is fully returned to the operating position. Due to this momentum of the spring housing 73 substantial force is applied on the connection of the housing 73 to the support plate 76. However, this force is dissipated without damage to the support plate 76 by means of the flexible connection provided by the spring-bolt assemblies 77 that tie the housing 73 to the plate 76.

Referring now to FIGS. 15–18, a third preferred embodiment 120 of the coupling assembly of the present invention is shown. The assembly 120 is somewhat similar to the coupling assembly 10 and like numbers are employed for like components. The primary differences between the coupling assemblies 10 and 120 are that the coupling assembly 120 has link assemblies 121 and a spring unit 122 in place of the link assemblies 41 and the spring unit 50 respectively.

Similar to the link assemblies 41, the link assemblies 121 each include inner links 125 pivotally connected near their bottom ends at 126 to the main support member 36 (FIG. 16), and outer links 127 pivotally connected near their bottom ends at 128 to the tool shank 21. Each inner link 125 is pinned at 129 to its associated outer link 127 near the upper ends thereof. The spring unit 122 is mounted on the link assemblies 121 and includes a pin 130 journaled in lugs 131 protruding from the inner links 125, and a pin 132 journaled in lugs 133 that protrude from the outer links 127.

The lugs 131 and 133 are mounted on the links 125 and 127, respectively, below the pin connection 129 therebetween. The pin 130 has bores 137 (FIG. 19) near each end thereof, and similar type bores 138 are formed in the pin 132 to lie in axial alignment with the bores 137. Elongated bolts 139 are disposed through each pair of the aligned bores 137 and 138 and coil springs 140 are disposed about the bolts 139 in a relation similar to the mounting of the spring 62 on the bolt 47 of the coupling assembly 10 to provide a yieldable pressure on the link assemblies 121 that opposes clockwise pivotal movement thereof.

Figure 20:
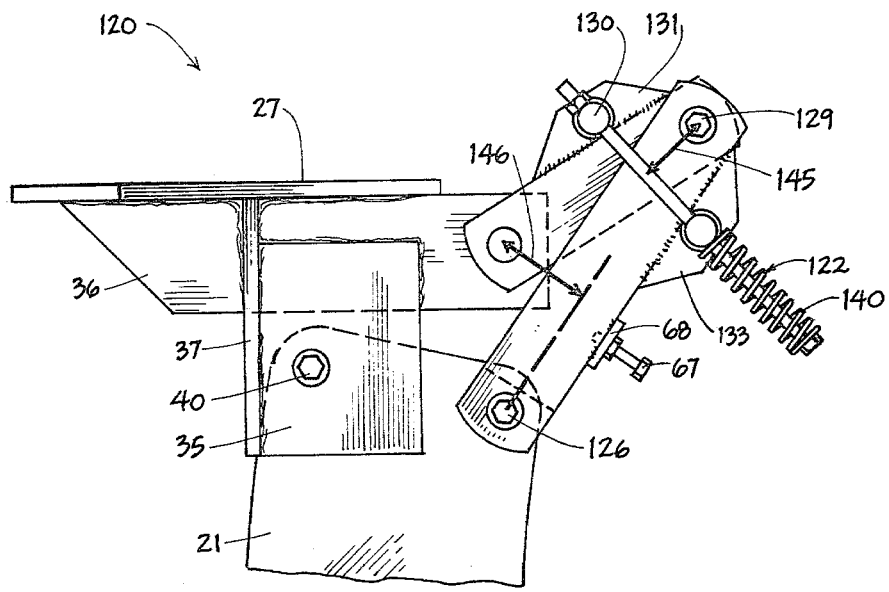
FIG. 20 is a side view illustrated similarly to that of FIG. 18, but showing the coupling assembly in an intermediate position pivotally moved from the normal operating position therefor shown in FIG. 18.
Figure 21:
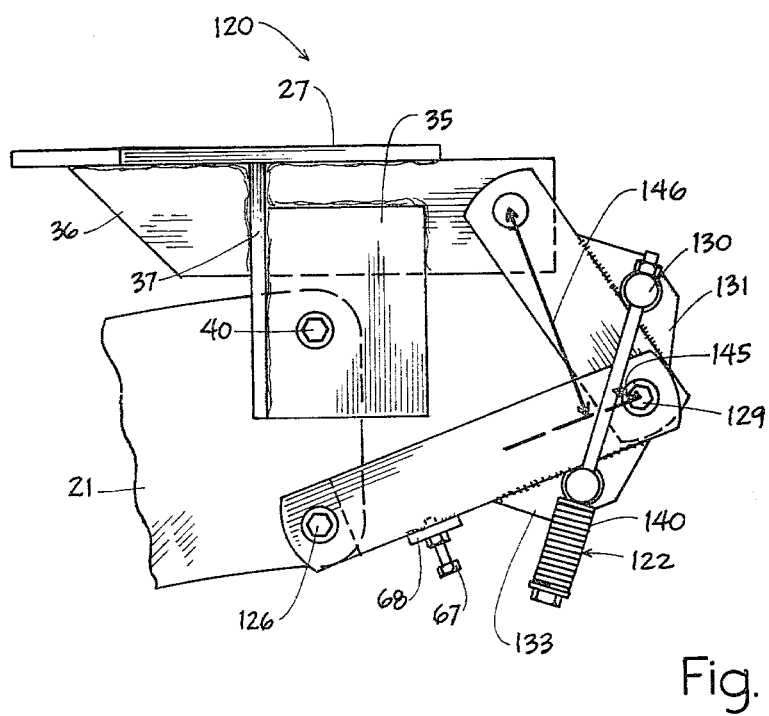
FIG. 21 is a side view illustrated similarly to that of FIG. 20 but showing the tool in the inoperative position therefor wherein the tool is at the maximum limit of its rearward pivotal movement from the normal operating position therefor shown in FIG. 18.

As indicated by FIG. 18, when the link assemblies 121 are in a substantially upright position the pressure applied by the spring units 122 has a moment arm 145 approximately equal to one-third the distance between the pin connections 128 and 129. In contrast, a force applied on the tool 21 has a short moment arm 146. However, similar to the operation of the previously described embodiments 10 and 70, as the link assemblies 121 are pivoted in a clockwise direction, as shown in FIGS. 20 and 21, the moment arm 145 decreases to a minimum that is reached when the tool 20 has been pivoted rearwardly through its full limit of movement. Accordingly, although the springs 140 are fully compressed, the torque applied thereby on the link assemblies 121 is at a minimum. Thus, the placement of the spring units 122 beneath the pin connections 129 of the inner and outer links 125 and 129, respectively, provides substantially the same type of operation as that provided by the first two embodiments, so that as the tool 20 is pivoted rearwardly, the force opposing such movement provided by the spring units 22 is reduced until it reaches a minimum at the end of the pivotal movement of the tool 20.

Thus, the coupling assemblies 10, 70 and 120 provide a means for holding the work-tools of a ground tilling implement in a soil engaging position during normal operation, but permit pivotal movement of the ground tools upon encountering large obstacles. To produce such pivoting the obstacle must be of a sufficient size to exert a large initial force on the tool, but once pivoting movement of the tool is begun, it can be maintained by a relatively low force so that the tool readily moves out of the path of the obstacles and is thereby shielded from damage by the obstacle.

I claim:

1. A tool coupling assembly for mounting the shank of a ground tool to a clamping member carried on the lower side of a tool bar of a soil tilling farm implement for pivotal movement of the tool from a normal operating soil engagement position to an inoperative position upon encountering an obstruction during a tilling operation, said assembly comprising:
   (a) a mounting member fixed to a lower portion of said clamping member,
   (b) a first pivot means pivotally connecting said tool shank with said mounting member,
   (c) a variable pressure means for applying a variable pressure on said tool during movement of the tool from an operating soil engaging position to a rearwardly moved inoperative soil engaging position,
   (d) said variable pressure means including:
     (1) a pair of link members, one of which is of a longer length than the other, arranged in an upright side by side relation when the tool is in an operating soil engaging position,
     (2) means pivotally interconnecting the upper portions of said link members for relative pivotal movement about a common axis extended laterally thereof,
     (3) a second pivot means pivotally connecting said tool shank with a lower portion of said one link member at a position forwardly of said first pivot means,
     (4) a third pivot means pivotally connecting said mounting member with a lower portion of said other link member,
     (5) a yieldable pressure unit interconnecting the upper end portions of said link members for applying a yieldable pressure on each of said link members, said pressure unit including:
       (a) a compressible spring bias member mounted on one of said link members and having a spring member,
       (b) flexible means for connecting said other of said link members to said spring member whereby said spring member is compressed during said relative pivotal movement of said link members,
   (e) said variable pressure means in a first moved position thereof acting to initially hold said tool in the operating soil engaging position therefor, and in a second moved position being rendered ineffective to move said tool from the inoperative soil engaging position to the operating soil engaging position therefor, said variable pressure means being movable from the first position to the second position therefor in response to said tool striking an obstruction in the soil providing for the application of a counter pressure on said tool greater than said initial acting tool holding pressure.

* * * * *